United States Patent
Grundmeier

(10) Patent No.: US 8,454,774 B2
(45) Date of Patent: Jun. 4, 2013

(54) METHOD OF PRODUCING A STABILIZER WITH A STABILIZER BEARING

(75) Inventor: Georg Grundmeier, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/195,191

(22) Filed: Aug. 1, 2011

(65) Prior Publication Data

US 2012/0024463 A1  Feb. 2, 2012

(30) Foreign Application Priority Data

Aug. 2, 2010 (DE) .......................... 10 2010 033 036

(51) Int. Cl.
*B60G 11/18* (2006.01)

(52) U.S. Cl.
USPC .............. 156/91; 156/297; 156/153; 156/228; 280/124; 280/107

(58) Field of Classification Search
USPC .............. 156/91, 297, 153, 228; 280/124.107
See application file for complete search history.

(56) References Cited

U.S. PATENT DOCUMENTS

| 5,884,926 A | 3/1999 | Muzio et al. |
| 2003/0187154 A1* | 10/2003 | Schoenfeld et al. .......... 525/523 |
| 2005/0006011 A1 | 1/2005 | Beer et al. |
| 2006/0082093 A1* | 4/2006 | Sterly et al. ............. 280/124.106 |
| 2006/0091595 A1* | 5/2006 | Hayashi et al. ................ 267/276 |
| 2010/0244395 A1* | 9/2010 | Sugiura et al. .......... 280/124.107 |

FOREIGN PATENT DOCUMENTS

| DE | 44 15 599 A1 | 8/1995 |
| DE | 697 11 976 T2 | 11/1997 |
| DE | 199 12 397 A1 | 9/2000 |
| DE | 10 2005 050 612 A1 | 5/2006 |
| EP | 1 048 861 A2 | 11/2000 |
| EP | 2 243 620 A2 | 10/2010 |
| WO | WO 2008/058912 A1 | 5/2008 |

* cited by examiner

*Primary Examiner* — Katarzyna Wyrozebski Lee
*Assistant Examiner* — Jaeyun Lee
(74) *Attorney, Agent, or Firm* — Henry M. Feiereisen LLC

(57) ABSTRACT

In a method of producing a stabilizer for a motor vehicle, a stabilizer bearing portion of a stabilizer is chemically pretreated by applying an adhesive. The stabilizer and two vulcanized elastomer-metal bearing half-shells are then placed in a joining apparatus for subsequent bonding of the bearing half-shells with the stabilizer bearing portion.

5 Claims, 1 Drawing Sheet

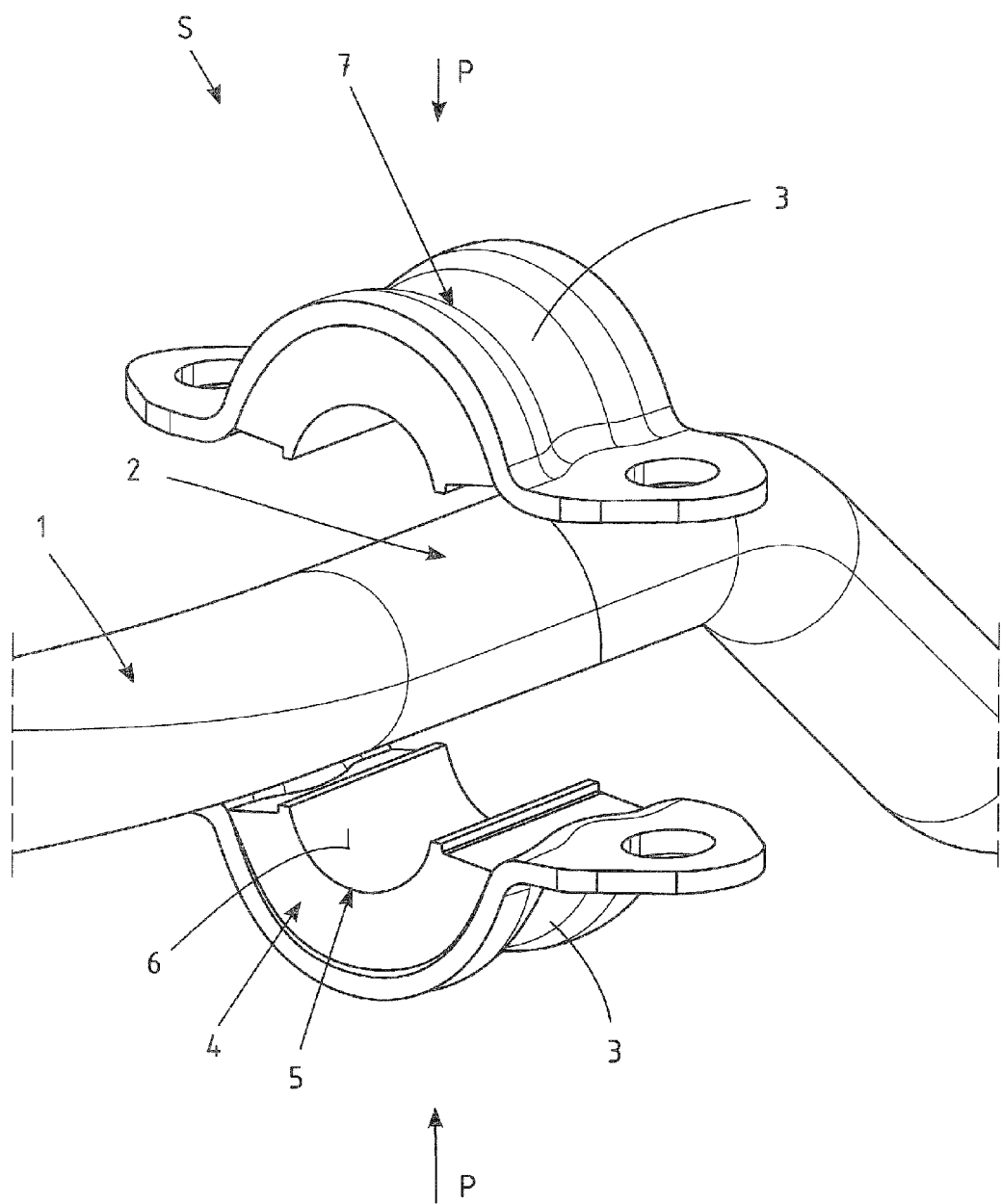

METHOD OF PRODUCING A STABILIZER WITH A STABILIZER BEARING

CROSS-REFERENCES TO RELATED APPLICATIONS

This application claims the priority of German Patent Application, Serial No. 10 2010 033 036.1, filed Aug. 2, 2010, pursuant to 35 U.S.C. 119(a)-(d), the content of which is incorporated herein by reference in its entirety as if fully set forth herein.

BACKGROUND OF THE INVENTION

The present invention relates to a method of producing a stabilizer with a stabilizer bearing for use in a motor vehicle.

The following discussion of related art is provided to assist the reader in understanding the advantages of the invention, and is not to be construed as an admission that this related art is prior art to this invention.

Stabilizers in the automobile construction involve torsion spring bars to stabilize the vehicle body against tilt and twist, when the motor vehicle travels in a curve. In addition, stabilizers are provided for wheel load compensation, for example when traveling in curves or also when driving over an obstacle or the like. Stabilizers normally extend across the entire width of the vehicle and are coupled to the vehicle axles in the area of the front axle and in the area of the rear axle.

Stabilizers are supported underneath the vehicle body on the vehicle body itself to prevent adverse influences and vibrations of the unsprung wheel masses from being transmitted to the body. In order to still ensure adequate support, application of elastomeric torsion bar shoulder bearings has been proposed. These torsion bar shoulder bearings are mostly configured as sleeve bearings and coupled with the sleeve to the vehicle body.

The elastomer spring in the torsion bar shoulder bearings is provided to establish a resilient support of the stabilizer or stabilizer torsion bar and to provide a bridge for structure-borne sound to transmit vibrations or other adverse influences to the motor vehicle body in a filtered and attenuated manner only. The torsion bar shoulder bearings are exposed to substantial forces which are transmitted to the bearings as rotational forces caused by torsion, and translational forces as a result of the spring effect.

It would therefore be desirable and advantageous to provide an improved method of producing a stabilizer with a stabilizer bearing for use in a motor vehicle to obviate prior art shortcomings.

SUMMARY OF THE INVENTION

According to one aspect of the present invention, a method of producing a stabilizer for a motor vehicle includes the steps of chemically pre-treating a stabilizer bearing portion of a stabilizer by applying an adhesive base, placing the stabilizer and two vulcanized elastomer-metal bearing half-shells in a joining apparatus, and bonding the bearing half-shells with the stabilizer bearing portion.

The present invention resolves prior art shortcomings by using two elastomer-metal bearing half-shells that have been vulcanized and constitute generally commercially available parts. Elastomer-metal bearing half-shells are bearing half-shells which have each on their outside a bracket made of a metallic material and an elastomeric spring composite which is vulcanized into the bracket inside. The spring composite may involve a conventional elastomer compound or a rubber-like elastomer compound.

A stabilizer bearing portion of the stabilizer is pre-treated and involves a portion extending in longitudinal direction of the stabilizer and corresponding substantially in its length dimension to the length dimension of the stabilizer bearing. Pre-treatment of the stabilizer bearing portion is carried out chemically by applying an adhesive base which may be a primer or an adhesive compound to establish an improved joint of the subsequent bonding. Chemical pre-treatment may also involve cleaning. For example, a cleaner, e.g. an alcohol-containing or acetone-containing cleaner, may be used to prepare the stabilizer bearing portion so as to be free from any chemical, sticky or greasy surface substances. This ensures that the bond is realized with high product reliability and reproducibility.

According to another advantageous feature of the present invention, the chemical pretreatment may be executed mechanically, e.g. through abrasive treatment. The chemical pretreatment may also be carried out physically. Abrasive treatment involves grinding, blasting, or machining. Examples of abrasive treatment include grit blasting, sand blasting, or ice blasting. As a result of abrasive treatment, contaminants are removed from the surface and the surface is roughened and thereby enlarged to enhance the subsequent bonding effect. In addition, the roughened surface in combination with the bonding results in a forced engagement, material joint and formfitting engagement.

The stabilizer and the bearing half-shells are subsequently bonded in the joining apparatus. An example of a joining apparatus includes a measuring gauge which ensures that the elastomer-metal bearing half-shells are positioned in length direction on the correct length portion of the stabilizer, or a machine which accommodates the bearing half-shells and in which the stabilizer is then placed for subsequent bonding of the bearing half-shells with the stabilizer. The stabilizer itself may be held in the machine or held in place by an installer. Overall, a method according to the present invention is capable to provide a stabilizer with a stabilizer bearing in a simple and cost-efficient manner and with long service life.

According to another advantageous feature of the present invention, the bearing half-shells may be crimped about the stabilizer bearing portion in the joining apparatus. As a result, a formfitting connection of the bearing shells is attained which further positively affects reproducibility and longevity of a stabilizer bearing. In particular as a result of production tolerances of elastomers or rubber-like spring materials, crimping enables in a cost-efficient manner a compensation of these production tolerances. The bearing half-shells may be provided for crimping with a profile to establish a bracket-like engagement in the form of an interlock or clip. The bearing shells may also be spot-welded during crimping and subsequently crimped.

According to another advantageous feature of the present invention, the bearing half-shells can be maintained under tension during the bonding step. Production tolerances of elastomer materials can thereby again be compensated and the bearing and transmission properties of the stabilizer bearing can be improved. Advantageously, the bearing half-shells are maintained under tension by more than 10%. Currently preferred is more than 20%. This has a positive effect in particular on longevity because it prevents the stabilizer bearing from wearing out.

According to another advantageous feature of the present invention, the bearing half-shells may be bonded to the stabilizer bearing portion by a single-component adhesive. This provides a simple and reproducible way to couple the elastomer-metal bearing half-shells and the stabilizer. The adhesive may be applied onto the elastomer-metal bearing half-shells beforehand or on the stabilizer bearing portion. Of course, adhesive compounds may be applied to both the stabilizer bearing portion and the elastomer-metal bearing half-shells. The adhesive may be applied across the entire surface or also spotwise, in which case the adhesive will disperse across the entire surface between the stabilizer bearing portion and the elastomer-metal bearing half-shells during bonding and crimping.

Adhesive may be applied before or during the joining operation, for example when the joining apparatus is automated. Advantageously, the adhesive is applied by a spraying process or injection process. The use of a single-component adhesive in combination with the chemical or mechanical pre-treatment renders the need for a complicated production of a two-component adhesive unnecessary.

According to another advantageous feature of the present invention, the stabilizer bearing may be heat treated at least in some regions thereof after bonding. As a result, the adhesive can again be liquefied to migrate into regions that have not yet been exposed to adhesive. This enhances quality of the bonding. Using a temperature-hardening adhesive enables through heat treatment, at least in some regions of the stabilizer bearing, a targeted curing of the adhesive, thereby rendering the production process economical. It is also possible to cure the adhesive more rapidly to shorten the cycle time of the production of the stabilizer bearing.

According to another advantageous feature of the present invention, the stabilizer bearing portion may be provided with a profile to establish a formfitting connection between at least one of the half-shells and the stabilizer bearing portion. Examples of a profile include a recess, an opening, or a protrusion in the shape of a lobe, lug, or the like. When configured as a recess for example, elastomer material or adhesive is able to fill the profile, thereby enhancing the quality of the coupling as a result of the formfit. When configured as a protrusion, the profile is able to press into the adhesive layer or elastomer material, thereby also enhancing quality and adhesive force as a result of the attained formfit and surface enlargement.

According to another variation of a profile, a feather key may be provided in the stabilizer in the area of the stabilizer bearing portion.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a fragmentary exploded view of a stabilizer with a stabilizer bearing produced by a method according to the present invention.

DETAILED DESCRIPTION OF PREFERRED EMBODIMENTS

The depicted embodiment is to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown an exploded view of a stabilizer, generally designated by reference numeral 1 in an area of a stabilizer bearing. The stabilizer 1 has a stabilizer bearing portion 2 which is produced by a method in accordance with the present invention, involving a chemical pre-treatment of the stabilizer bearing portion 2. Chemical pre-treatment may involve abrasive treatment and optionally a cleaning e.g. by means of an alcohol-containing or acetone-containing cleaner to free the surface of the stabilizer bearing portion 2 from any chemical, sticky or greasy surface substances. Subsequently a primer or adhesive base is applied on the surface of the stabilizer bearing portion 2.

In a next step, elastomer-metal bearing half-shells 3 are positioned in the region of the stabilizer bearing portion 2 and then moved in direction of arrow P towards the stabilizer bearing portion 2 and coupled. Each bearing half shell 3 includes on the outside a metal bracket 7 and on the inside an elastomeric spring 4 which has been vulcanized into the bracket 7 and is shaped to provide a bearing recess 5. In the non-limiting example of FIG. 1, adhesive 6 is applied in the area of the bearing recess 5 upon the elastomeric spring 4.

After application of the adhesive 6, the stabilizer 1 and the two vulcanized elastomer-metal bearing half-shells 3 are placed in a joining apparatus, not shown in greater detail, for subsequent bonding of the bearing half-shells 3 with the stabilizer bearing portion 3. Suitably, the bearing half-shells 3 are held under tension in the joining apparatus during the joining operation.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of producing a stabilizer for a motor vehicle, comprising the steps of:
   mechanically pre-treating a stabilizer bearing portion of a stabilizer by applying abrasive treatment;
   chemically pre-treating the stabilizer bearing portion by applying a single-component adhesive;
   placing the stabilizer and two vulcanized elastomer-metal bearing half-shells in a joining apparatus, each of said bearing half-shells comprising one elastomer constructed in one piece;
   crimping the bearing half-shells about the stabilizer bearing portion in the joining apparatus to one another;
   bonding the bearing half-shells with the stabilizer bearing portion; and
   heat treating the stabilizer bearing at least in some regions thereof, wherein the stabilizer bearing portion is provided with a profile to establish a formfitting connection between at least one of the half-shells and the stabilizer portion.

2. The method of claim 1, wherein the bearing half-shells are maintained under tension during the bonding step.

3. The method of claim 1, wherein the bearing half-shells are maintained under tension during the bonding step by more than 10%.

4. The method of claim 1, wherein the bearing half-shells are maintained under tension during the bonding step by more than 20%.

5. The method of claim 1, wherein the profile is a feather key provided in the bearing portion.

* * * * *